United States Patent
Suh et al.

(10) Patent No.: US 8,993,195 B2
(45) Date of Patent: Mar. 31, 2015

(54) FUEL CELL AND METHOD OF MANUFACTURING THE SAME

(75) Inventors: Jun-Won Suh, Yongin-si (KR); Ho-Jin Kweon, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 778 days.

(21) Appl. No.: 12/908,776

(22) Filed: Oct. 20, 2010

(65) Prior Publication Data
US 2011/0287339 A1    Nov. 24, 2011

(30) Foreign Application Priority Data

May 19, 2010    (KR) ................. 10-2010-0046934

(51) Int. Cl.
H01M 8/02 (2006.01)
C23C 18/12 (2006.01)
C25D 5/12 (2006.01)
H01M 8/12 (2006.01)
H01M 8/24 (2006.01)

(52) U.S. Cl.
CPC ......... *H01M 8/0252* (2013.01); *C23C 18/1216* (2013.01); *C23C 18/1225* (2013.01); *C25D 5/12* (2013.01); *H01M 8/028* (2013.01); *H01M 8/0286* (2013.01); *H01M 8/1206* (2013.01); *H01M 8/243* (2013.01); *H01M 8/2485* (2013.01); *Y02E 60/521* (2013.01); *Y02E 60/525* (2013.01)
USPC ........... 429/510; 429/509; 429/508; 429/507; 429/465; 429/466; 429/496; 429/497

(58) Field of Classification Search
None
See application file for complete search history.

(56) References Cited

U.S. PATENT DOCUMENTS

| | | | |
|---|---|---|---|
| 4,072,243 A * | 2/1978 | Conant et al. | 215/12.2 |
| 5,279,909 A * | 1/1994 | Horner et al. | 429/184 |
| 2007/0231660 A1 * | 10/2007 | Song et al. | 429/35 |

FOREIGN PATENT DOCUMENTS

| | | |
|---|---|---|
| JP | 10-050331 | 2/1998 |
| JP | 10-189016 | 7/1998 |
| JP | 2000-331692 A | 11/2000 |
| JP | 2004-146131 | 5/2004 |

(Continued)

OTHER PUBLICATIONS

Song and Placido ("Investigation on initial oxidation kinetics of Al, Ni, and Hf metal film surfaces", Chinese Optics Lett. Apr. 30, 2010, vol. 8 p. 87).*

(Continued)

*Primary Examiner* — Milton I Cano
*Assistant Examiner* — Wojciech Haske
(74) *Attorney, Agent, or Firm* — Christie, Parker & Hale, LLP (57) ABSTRACT

A fuel cell includes a unit cell, a cell fixing member and a welding portion. The unit cell includes a first electrode layer, an electrolyte layer surrounding the first electrode layer, a second electrode layer surrounding the electrolyte layer while exposing an end portion of the electrolyte layer, and a coating layer formed by coating a mixture of ceramic and metal on the exposed end portion of the electrolyte layer. The cell fixing member includes a flow tube inserted into the unit cell, a fixing tube provided to an outside of the flow tube, and a connecting portion connecting the fixing tube and the flow tube to each other and to restrict an insertion depth of the electrolyte layer and the first electrode layer. The welding portion fixes and seals the coating layer and the inner circumferential surface of the fixing tube to each other.

16 Claims, 14 Drawing Sheets

(56) References Cited

FOREIGN PATENT DOCUMENTS

| | | |
|---|---|---|
| JP | 2004-349069 A | 12/2004 |
| KR | 10-0681007 | 2/2007 |

OTHER PUBLICATIONS

KIPO Office action dated Nov. 30, 2012 for KR-10-2011-0016652, 1 page.

* cited by examiner

| Ni:YSZ | Leak rate(X10-6 atm cc/sec) |
|---|---|
| No coating | >100(Leak occurrence) |
| 30:70 | 1.500 |
| 50:50 | 1.400 |
| 70:30 | 0.140 |
| 80:20 | 0.035 |
| 90:10 | 0.040 |

| Ni:YSZ | Leak rate(X10-6 atm cc/sec) |
|---|---|
| No coating | 187.000 |
| 30:70 | 1.500 |
| 50:50 | 1.400 |
| 70:30 | 0.140 |
| 80:20 | 0.035 |
| 90:10 | 0.040 |

FIG. 11

FUEL CELL AND METHOD OF MANUFACTURING THE SAME

CROSS-REFERENCE TO RELATED APPLICATION

This application claims priority to and the benefit of Korean Patent Application No. 10-2010-0046934, filed on May 19, 2010, in the Korean Intellectual Property Office, the entire content of which is incorporated herein by reference.

BACKGROUND

1. Field

The following description relates to a fuel cell and a method of manufacturing the same, in which an effective brazing process can be performed between a unit cell and a cell fixing member such as a cell cap or cell connector.

2. Description of the Related Art

A fuel cell is a cell that converts chemical energy generated by oxidation into electric energy. The fuel cell is an eco-friendly technology that generates electric energy from materials such as oxygen and hydrogen, which are abundant on the Earth. In the fuel cell, an electrochemical reaction is performed as an inverse reaction of the electrolysis of water by respectively supplying oxygen and fuel gas to a cathode and an anode, thereby producing electricity, heat and water. Therefore, the fuel cell produces electricity at high efficiency without causing pollution. In the fuel cell, the discharged material in the electricity generating process is mostly only water. Hence, the concern about pollution is very low, and generation efficiency is improved by about 40% or higher as compared with existing generation technologies. Also, unlike general heat engines, since a mechanically moving part is not required unlike general heat engines, the fuel cell has the advantages of miniaturization, low noise, and the like.

Fuel cells can be classified into an alkaline fuel cell (AFC), a phosphoric acid fuel cell (PAFC), a molten carbonate fuel cell (MCFC), a polymer electrolyte membrane fuel cell (PEMFC) or a solid oxide fuel cell (SOFC) according to the kind of utilized electrolyte.

Among these fuel cells, the SOFC is widely used because the position of an electrolyte is easily controlled, there is no concern about the exhaustion of fuel, and the lifetime of a material is long. The SOFC can be divided into a tube type or a plate type according to the shape of its unit cell. The tube type has been used and studied in anode-supported fuel cells.

Generally, in a cylindrical SOFC, the inside and outside of the cell have electrodes that differ from each other, and therefore, different kinds of fuels are supplied to the electrodes, respectively. In this case, when cracks are generated at a sealing portion due to the weakness of the sealing between a cell and a cell fixing member, both of the fuels are mixed and ignited at a high temperature. As a result, the temperature of the cell is rapidly increased, and hence, the degradation of the cell is caused. Therefore, a sealing process is very important.

SUMMARY

Aspects of embodiments of the present invention are directed toward a fuel cell and a method of manufacturing the same capable of improving the fixing and sealing ability between a unit cell and a cell cap or between a unit cell and a cell fixing member.

An aspect of an embodiment of the present invention is directed toward a connection between a unit cell having an electrolyte layer formed of a ceramic material and a cell fixing member formed of a metallic material.

According to an embodiment of the present invention, there is provided a fuel cell including a unit cell, a cell fixing member and a welding portion. The unit cell includes a first electrode layer having a hollow circular or polygonal cylinder shape, an electrolyte layer surrounding an outer circumferential surface of the first electrode layer, a second electrode layer surrounding the electrolyte layer while exposing an end portion of the electrolyte layer, and a coating layer formed by coating a mixture of ceramic and metal on an outer circumferential surface of the exposed end portion of the electrolyte layer. The cell fixing member includes a flow tube inserted into the unit cell to form a continuous flow path, a fixing tube provided to an outside of the flow tube to form a space for accommodating an end portion of the unit cell between the fixing tube and the flow tube, and a connecting portion connecting the fixing tube and the flow tube to each other and to restrict an insertion depth of the electrolyte layer and the first electrode layer. The welding portion is for fixing and sealing the coating layer and the inner circumferential surface of the fixing tube to each other.

In one embodiment, the cell fixing member is formed of a metallic material.

In one embodiment, the coating layer is coated to extend up to a bottom of the unit cell. In one embodiment, the coating layer is coated to extend up to a lower inner circumferential surface of the unit cell. In one embodiment, the electrolyte layer is further interposed between the unit cell and the extended coating layer.

In one embodiment, the coating layer is formed into a multi-layered structure in which the content of a metal element is continuously increased from the unit cell to the welding portion.

In one embodiment, a corner at an upper inner circumferential side of the fixing tube is chamfered or rounded.

In one embodiment, an uneven portion is formed on an inner circumferential surface of the fixing tube.

In one embodiment, the coating layer is formed of a mixture of yttria-stabilized zirconia (YSZ)-based ceramic and metal comprising NiO and/or CuO. In one embodiment, the welding portion includes BNi and/or BCu.

According to an embodiment of the present invention, there is provided a method of manufacturing a fuel cell with an effective connection between a cell fixing member and a unit cell. In the method, a unit cell is manufactured. Here the unit cell includes a cylindrical first electrode layer, an electrolyte layer that surrounds the outer circumferential surface of the first electrode layer, and a second electrode layer that surrounds the outer circumferential surface of the electrolyte layer so that one end portion of the electrolyte layer is exposed. Subsequently, a coating layer is formed to extend up to the bottom of the unit cell and/or to a lower inner circumferential surface of the unit cell. Subsequently, the coating layer is sintered and reduced.

The electrolyte layer interposed between the unit cell and the extended coating layer may be further formed before the forming of the coating layer.

The coating layer may be formed using a dip-coating method.

The dip-coating method includes a coating process of sequentially dipping the manufactured unit cell into a dip-coating solution, a drying process of drying the dip-coating solution, and a post-processing process of repeatedly performing the coating and drying processes while increasing the content of a metal element in the dip-coating solution.

The method may further include electrolytically plating Ni and/or Cu after the forming of the coating layer.

As described above, according to embodiments of the present invention, a heat treating process for effective fixing and sealing between a unit cell and a cell cap or cell fixing member is performed in the process of manufacturing the unit cell, so that an additional heat treating process is not required in a brazing process.

Also, the wettability between a surface of the unit cell and filler-metal used in the brazing process is improved using a welding portion, thereby increasing the fixing and sealing ability between the unit cell and a cell fixing member or between the unit cell and the cell cap. As a high sealing ability is secured, it can be expected that the lifetime of the fuel cell will be extended.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

In embodiments of the present invention, an anode-supported fuel cell is described as an example. However, the embodiments of the present invention are not limited to the anode-supported fuel cell but may be identically applied to a cathode-supported fuel cell. Hereinafter, the term "cell fixing member" refers to a cell connector.

Figure 1:
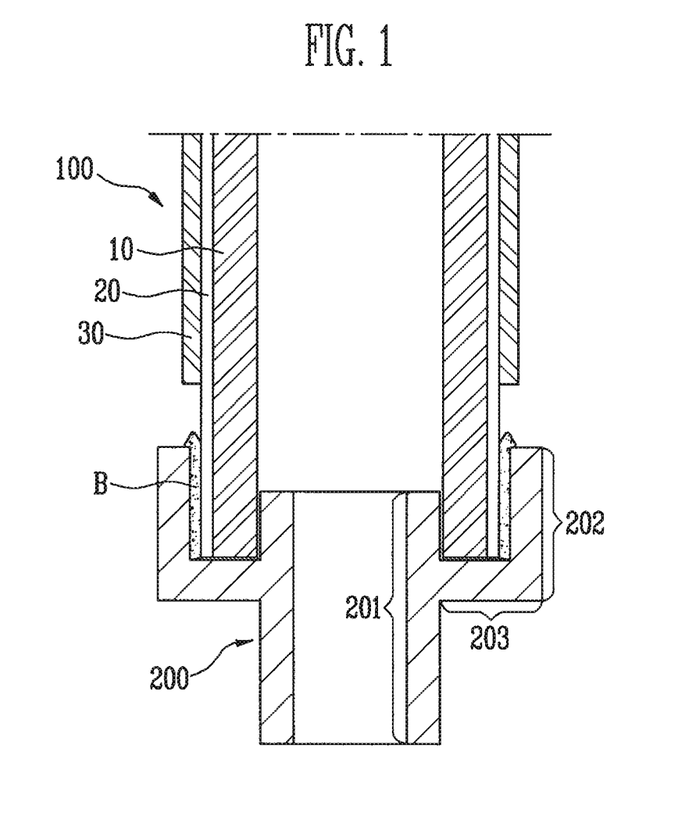
FIG. 1 is a sectional view showing a connection between a unit cell and a cell fixing member when no coating layer is formed.

A connection between a unit cell 100 and a cell fixing member 200, which has been developed pursuant to an embodiment of the present invention, is shown in FIG. 1. FIG. 1 is a longitudinal sectional view showing a state that the unit cell 100 and the cell fixing member 200 are connected to each other through a brazing method.

The unit cell 100 has a structure in which an electrolyte layer 20 and a cathode 30 are sequentially stacked on an outer surface of an anode 10. When a plurality of unit cells 100 are connected in series to one another, the cell fixing member 200 is used for connection between the unit cells 100. The cell fixing member 200 is used so that hydrogen gas and external air respectively supplied to the interior and exterior of the unit cell 100 are not mixed together. The cell fixing member 200 may be divided into a flow tube 201 through which the interiors of the unit cells 100 are connected to each other, and a fixing tube 202 and a connecting portion 203, which form a space for accommodating one end portion of the unit cell 100.

In a development process of the present invention, as shown in FIG. 1, brazing, at a welding portion B, is performed between the outer circumferential surface of an end portion of the unit cell 100 and the inner circumferential surface of the fixing tube 202 of the cell fixing member 200 so as to increase the fixing and sealing effect therebetween in the state that the end portion of the unit cell 100 is inserted into the cell accommodating space of the cell fixing member 200. However, while the unit cell 100 is formed of a ceramic material such as yttria-stabilized zirconia (YSZ), a cell cap or cell fixing member is formed of a metallic material. Hence, properties between the materials are different from each other, and therefore, the brazing process of the fuel cell has a considerably high degree of difficulty. Particularly, in a tube-type cell (cylindrical or plate-type cell), a brazing process using a heterogeneous metal is frequently used to perform sealing between the unit cell 100 formed of the ceramic material and the cell cap or cell fixing member formed of the metallic material. Since an electrolyte such as YSZ formed on the surface of the unit cell 100 and a welding portion such as $BNi_2$ used in the brazing process, i.e., filler-metal, have inferior wettability, the sealing is not performed well, which results in the lifetime degradation of the fuel cell.

An embodiment of the present invention has been invented to improve the wettability of the filler-metal. Hereinafter, the present invention will be described in more detail in conjunction with embodiments. Also, since an embodiment of the present invention relates to a connection between a unit cell and a cell fixing member, detailed descriptions of other components and configurations unrelated to the scope of the present invention will be omitted. Here, the other components include a felt layer provided to the interior of the fuel cell, a metal fixing tube, and the like.

In the embodiments of the present invention, the main components include the unit cell 100, the cell fixing member 200, a coating layer and the welding portion B.

Figure 2A:
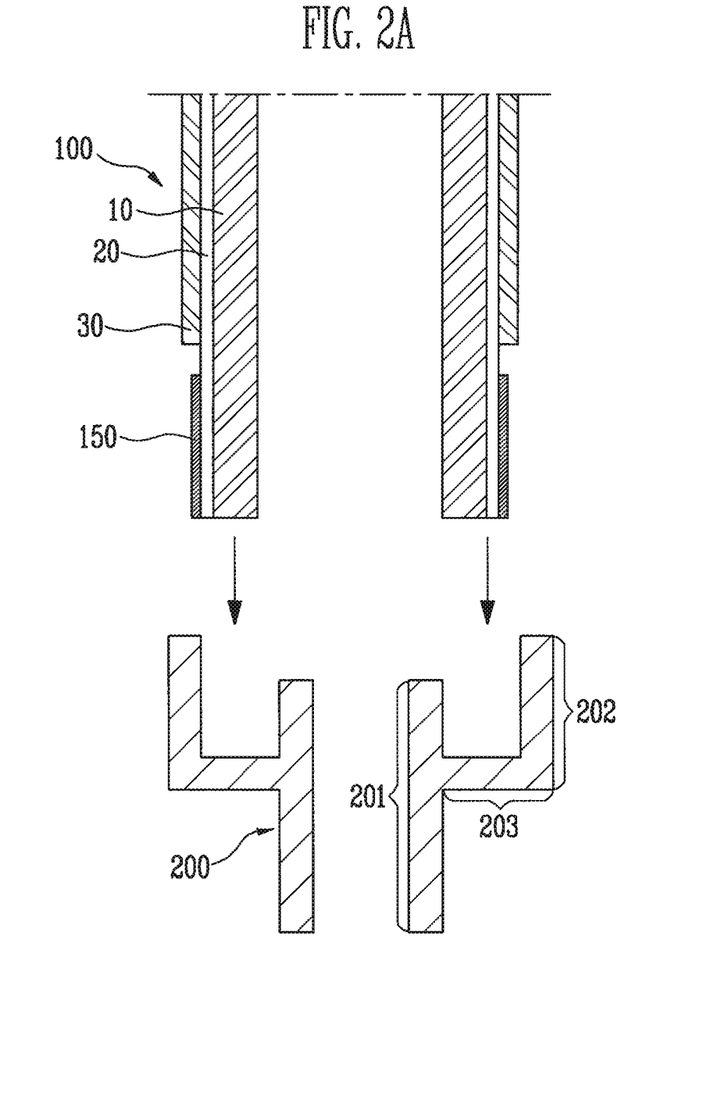
FIGS. 2A and 2B are sectional views showing a connection between a unit cell and a cell fixing member according to an embodiment of the present invention.

First, the unit cell 100 will be described with reference to FIG. 2A. The unit cell 100 is formed in the shape of a hollow circular or polygonal cylinder. The unit cell 100 is divided into a first electrode layer 10, an electrolyte layer 20 and a second electrode layer 30 from the interior to the exterior thereof. In this case, the electrolyte layer 20 is formed to surround the outer circumferential surface of the first electrode layer 10. The second electrode layer 20 is formed to surround the electrolyte layer 20 while exposing an end portion of the electrolyte layer 20. The interior of the unit cell 100 is formed as an anode or cathode according to the type of the fuel cell.

The electrolyte includes YSZ, ScSZ ($Sc_2O_3$-stabilized $ZrO_2$) with high conductivity, $CeO_2$ (doped $CeO_2$) containing a rare earth element and LSGM ($(La,Sr)(Ga,Mg)O_3$). Although the ion conductivity of the YSZ-based electrolyte is not relatively high, the YSZ-based electrolyte has a stable property of electrolyte under a wide oxygen partial pressure, a relatively stable chemical property, an excellent mechanical property, and a relatively moderate price. Hence, the YSZ-based electrolyte is most frequently used at present. Ni-YSZ cermet is most frequently used as the material of an anode because it has a low price, a stable property under a high-temperature reductive atmosphere, a thermal expansion coefficient similar to that of YSZ, and an excellent catalytic property. In the case of a high-temperature cathode used at a temperature of 800 to 1000° C., YSZ-based ceramic is frequently used as the material of the cathode for substantially the same reasons.

Figure 2B:
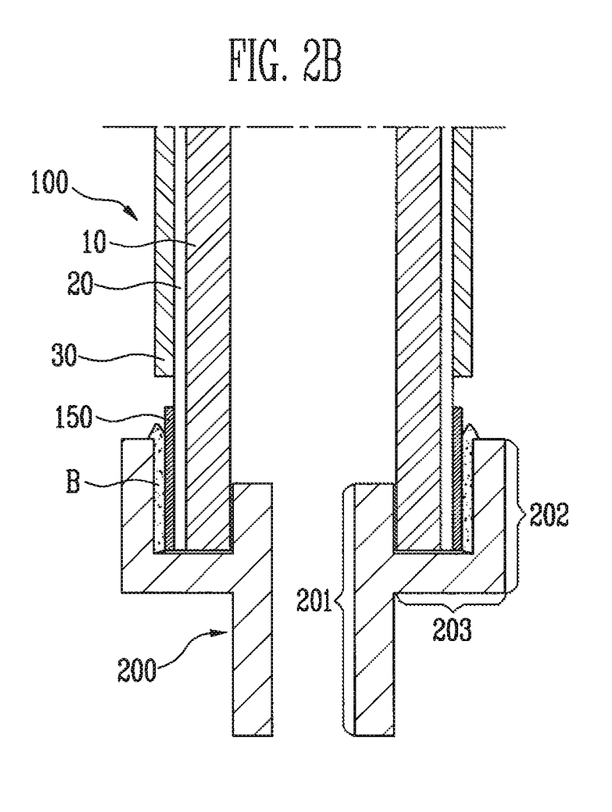

The cell fixing member 200 is described in more detail below with reference to FIGS. 2A and 2B. Here, the cell fixing member 200 is divided into a flow tube 201, a fixing tube 202 and a connecting portion 203. The flow tube 201 has one end inserted into the unit cell 100 through an opening at a lower end portion of the unit cell 100. The flow tube 201 is connected to the internal space of the unit cell 100, thereby forming a continuous flow path. Therefore, the flow tube 201 functions to transfer fuel or air to another component through the continuous flow path. The fixing tube 202 is provided at the outside of the flow tube 201 to have a diameter greater than that of the flow tube 201. Therefore, the fixing tube 202 forms a space for accommodating one end portion of the unit cell 100 between the fixing tube 202 and the flow tube 201. The connecting portion 203 connects the fixing tube 202 and the flow tube 201 to each other. The connecting portion 203 supports the fixing tube 202 and restricts the insertion depth of the unit cell 100. Also, the flow tube 201, the fixing tube 202 and the connecting portion 203 may be integrally provided to improve sealing performance, durability and the like.

Figure 3:
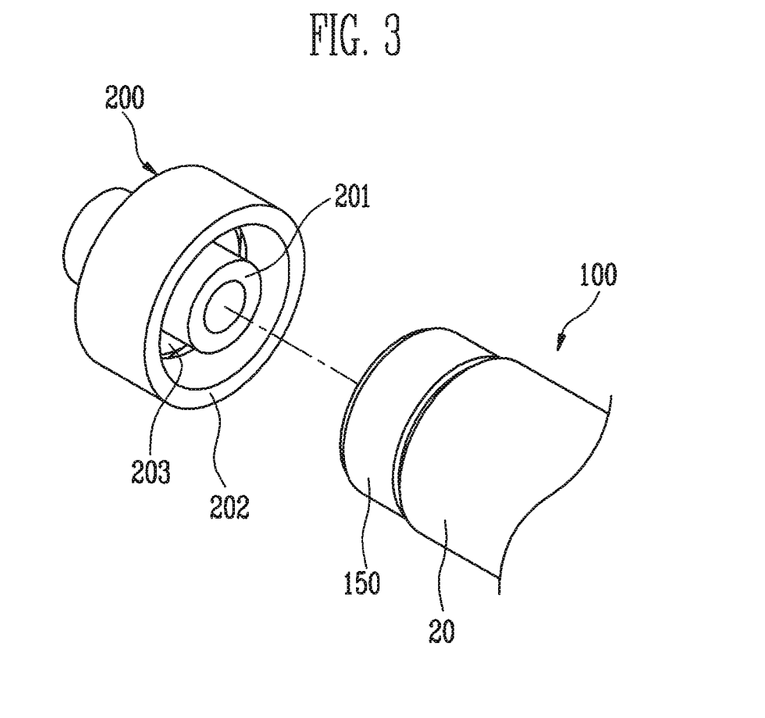
FIG. 3 is a perspective view showing the connection between the unit cell and the cell fixing member according to the embodiment of the present invention.

FIG. 3 is a perspective view showing the connection between the unit cell 100 and the cell fixing member 200 according to an embodiment of the present invention.

Figure 6:
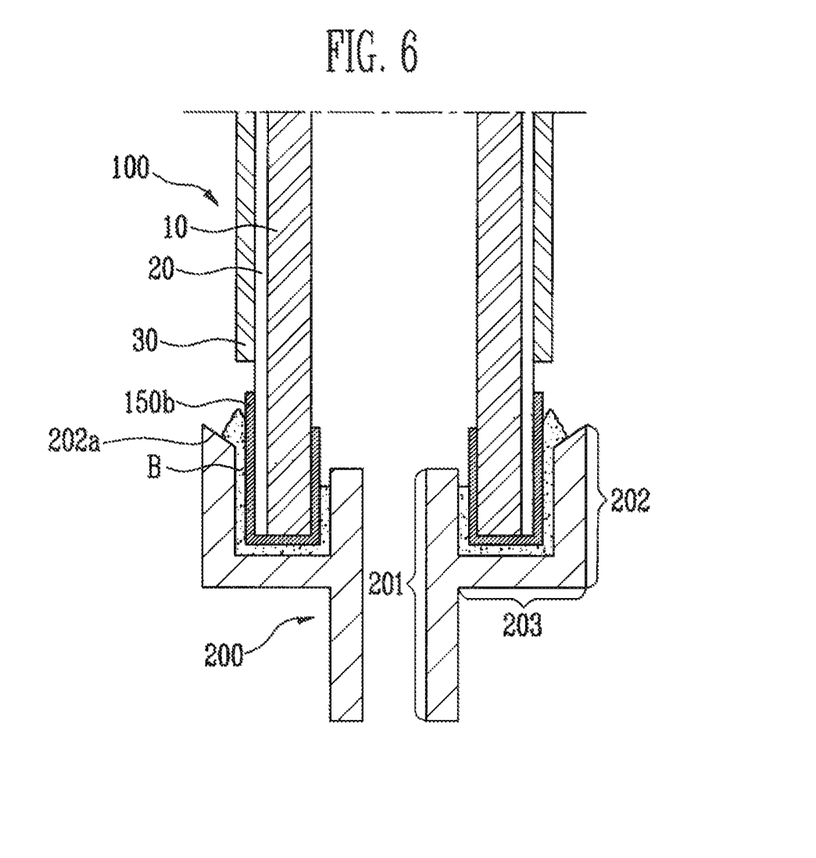
FIG. 6 is a sectional view showing a connection between a unit cell and a fixing member according to still another embodiment of the present invention.

In addition, as shown in FIG. 6, a corner 202a at the upper inner circumferential side of the fixing tube 202 may be subjected to chamfering or rounding. In this case, a certain amount of welding portion B is accommodated in a space formed by the chamfering or rounding, so that it is possible to prevent the welding portion, i.e., filler-metal from being overflowed during a brazing process.

Figure 7:
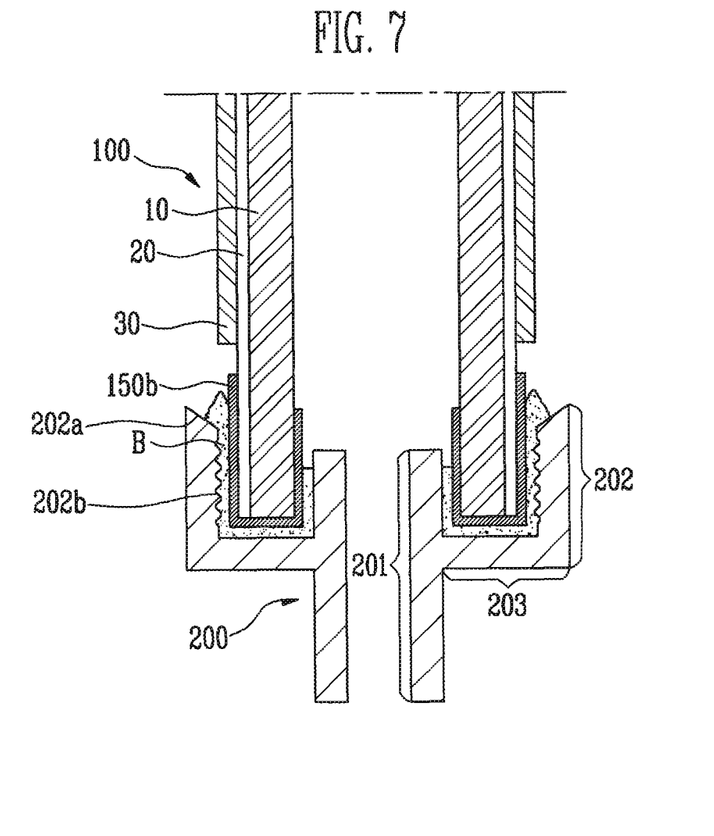
FIG. 7 is a sectional view showing a connection between a unit cell and a fixing member according to still another embodiment of the present invention.
Figure 8:
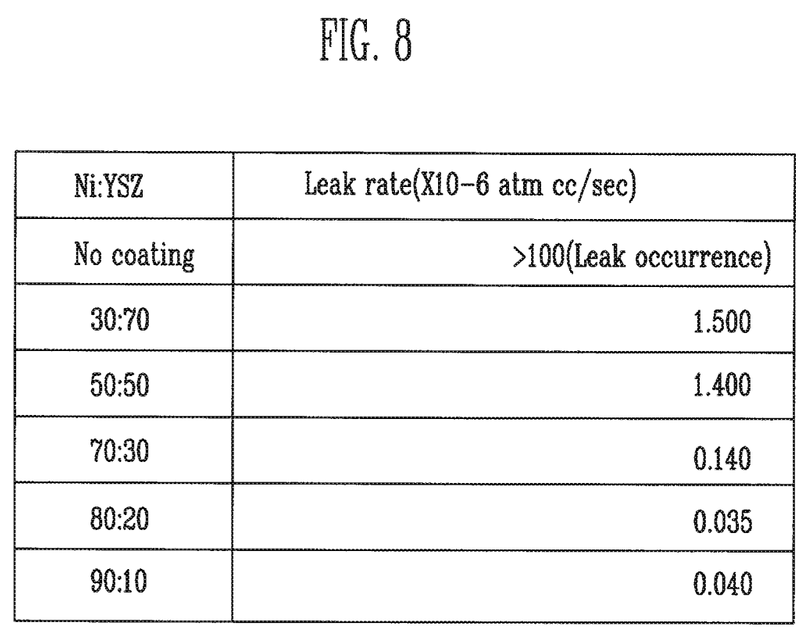
FIGS. 8, 9, 10, and 11 are tables and graphs showing results obtained in experiments performed with respect to crack occurrence frequency based on the composition ratio of a coating layer.
Figure 9:
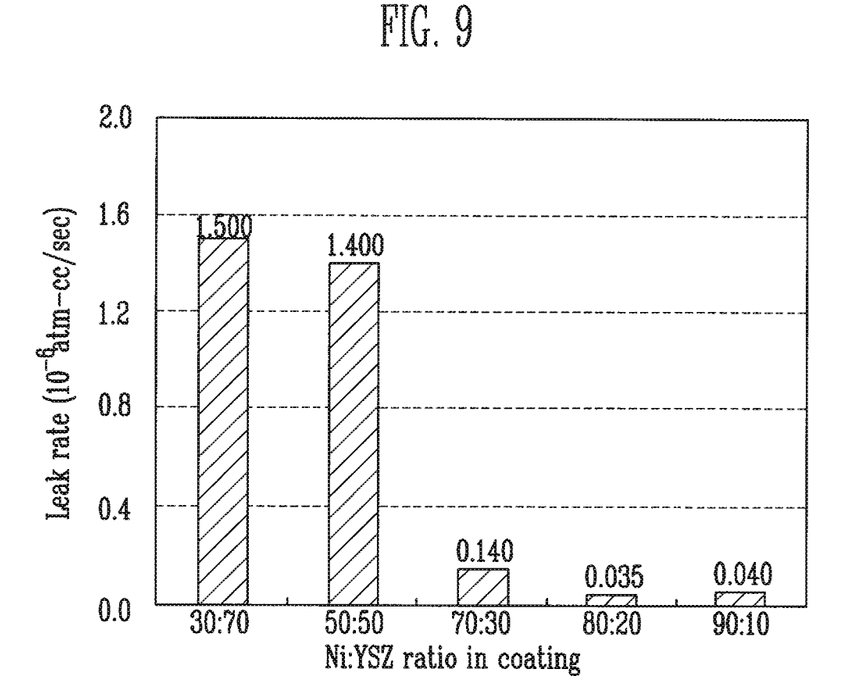
Figure 10:
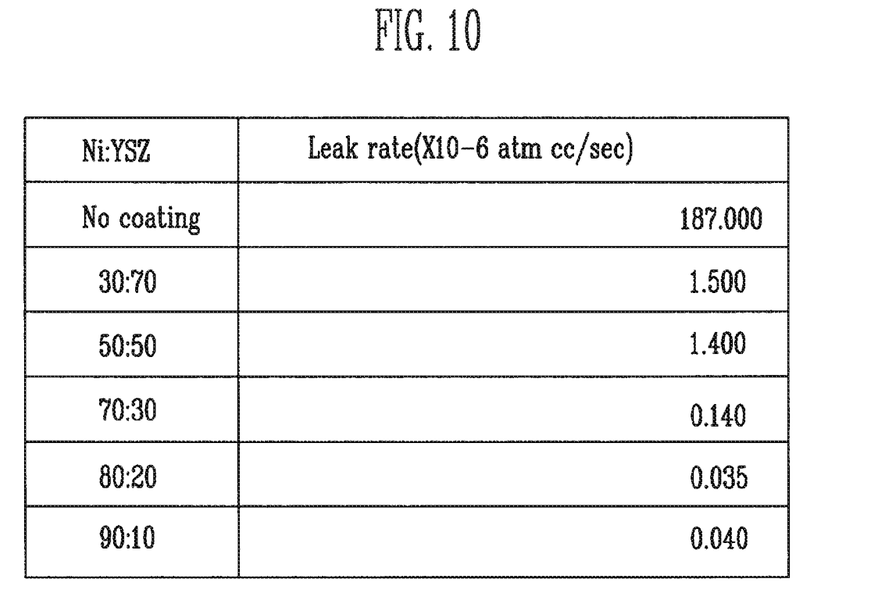
Figure 11:
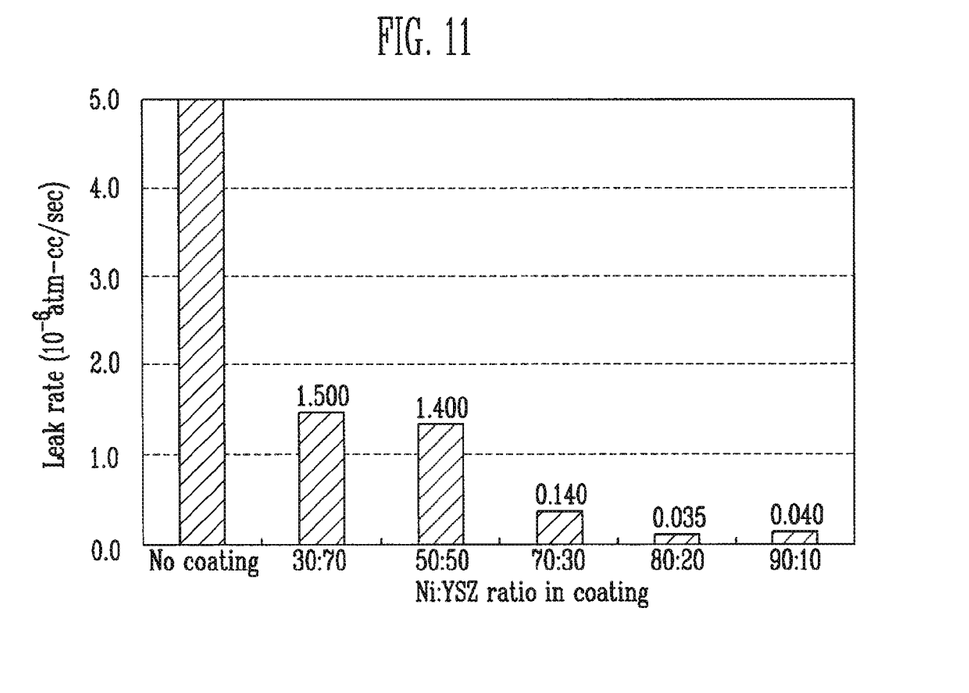

As shown in FIG. 7, an uneven portion 202b is further formed on the inner circumferential surface of the fixing tube 202. After the uneven portion 202b is formed, the brazing process is performed, so that the fixing ability between the unit cell 100 and the cell fixing member 200 can be further increased.

A coating layer 150 will be described with reference to FIGS. 2A, 4A and 5A. The coating layer 150 is formed on the outer circumferential surface of an electrolyte layer 20 that is not covered by a second electrode layer 30 and is exposed through the second electrode layer 30. The coating layer 150 is formed of a mixture of ceramic material and metal material differing from the ceramic material. In this case, at least one of NiO and CuO may be used as the material of the metal material, and YSZ may be used as the material of the ceramic material. Since YSZ is frequently used as the material of the electrolyte and YSZ-based ceramic is frequently used as the material of the anode and cathode, the fixing ability between the unit cell 100 and the cell fixing member 200 can be increased in the brazing process.

Figure 4A:
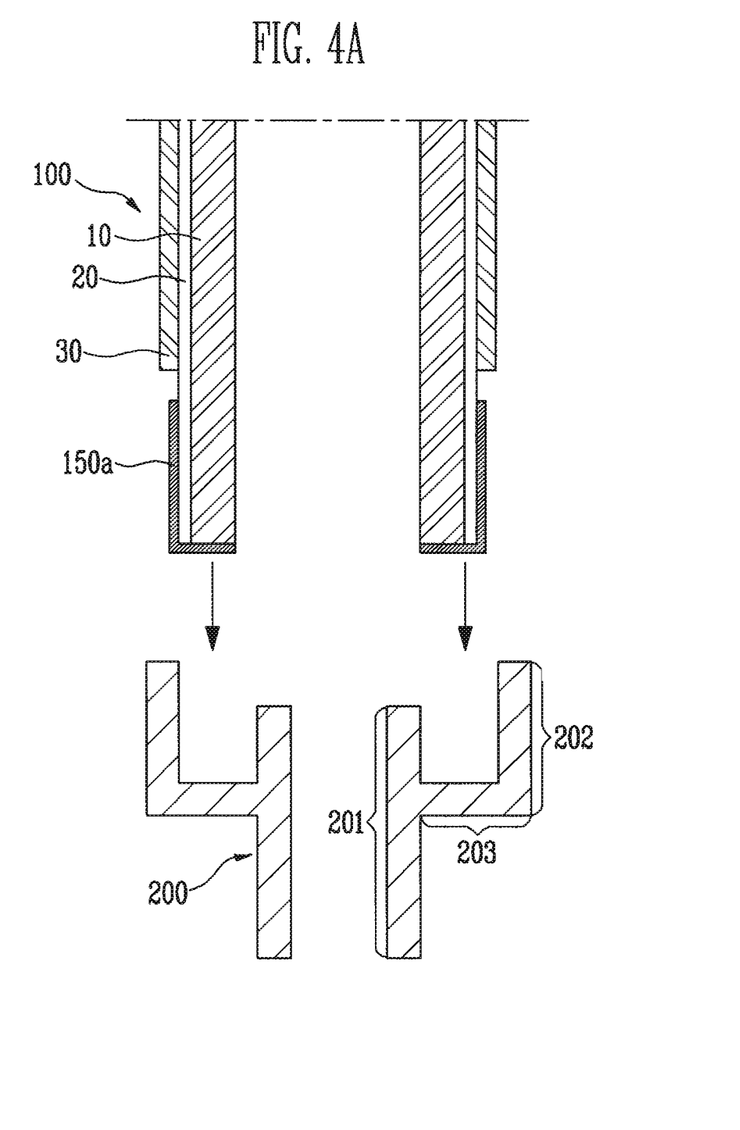
FIGS. 4A and 4B are sectional views showing a connection between a unit cell and a fixing member according to another embodiment of the present invention.
Figure 5A:
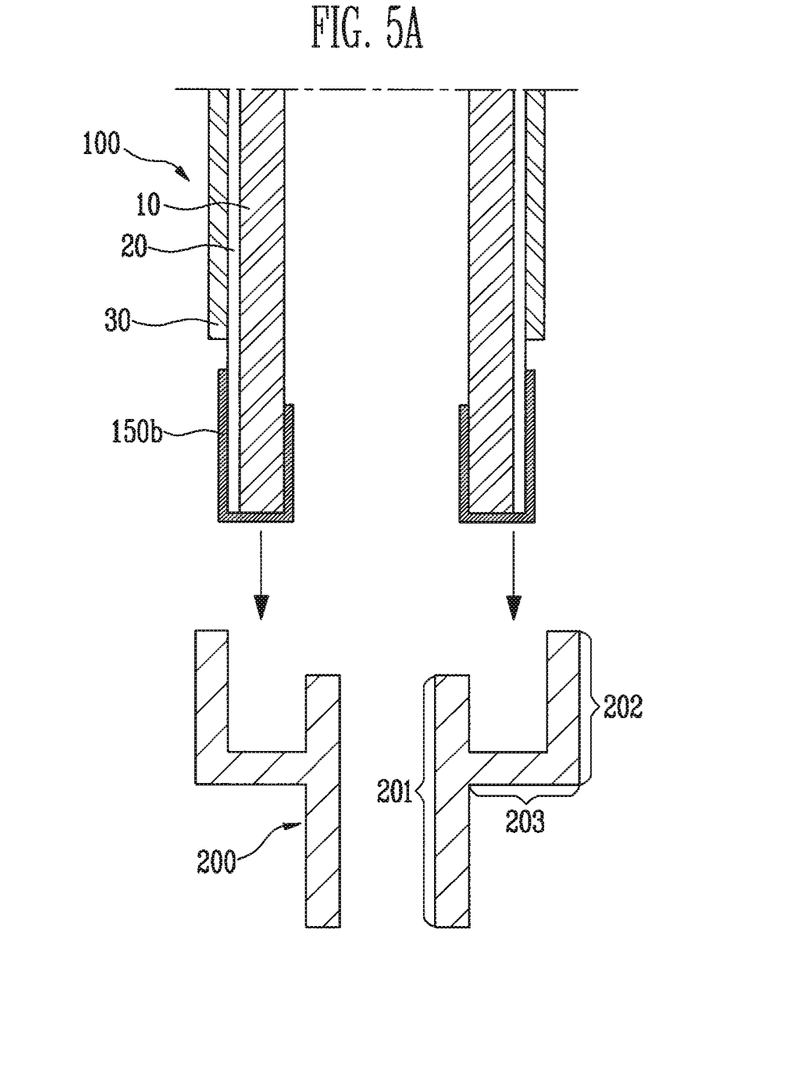
FIGS. 5A and 5B are sectional views showing a connection between a unit cell and a fixing member according to still another embodiment of the present invention.

Meanwhile, a coating layer 150b may be formed to extend up to the bottom of the unit cell 100 as shown in FIG. 4A, or a coating layer 150c may be formed to extend up to a lower inner circumferential surface of the first electrode layer 10 as shown in FIG. 5A. The coating layer 150 may be formed into a multi-layered structure in which the content of a metal element is gradually increased (or continuously increased or increased in a continuously increasing or linear manner) from the unit cell 100 to the outermost layer. In this case, elements at portions of the coating layer 150 that comes in contact with the electrolyte layer 20 and the cell fixing member 200 are different from each other, so that the fixing ability between the unit cell 100 and the cell fixing member 200 can be further increased in the brazing process. After the coating layer 150 is formed, electrolytic plating is additionally performed with respect to the coating layer 150 using Ni or Cu that is a metal with high wettability, so that the fixing ability between the unit cell 100 and the cell fixing member 200 can be further increased in the brazing process.

Figure 4B:
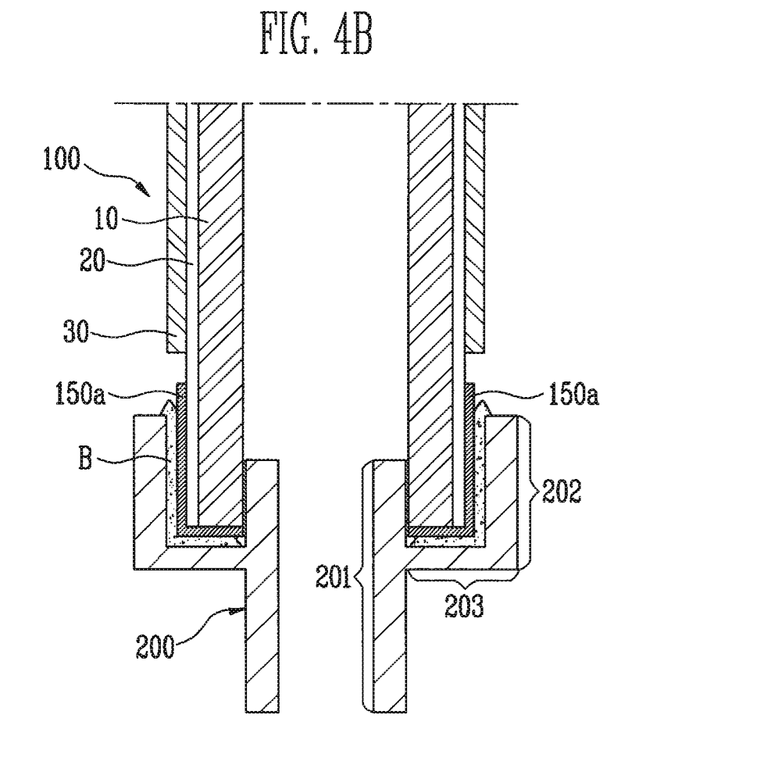
Figure 4C:
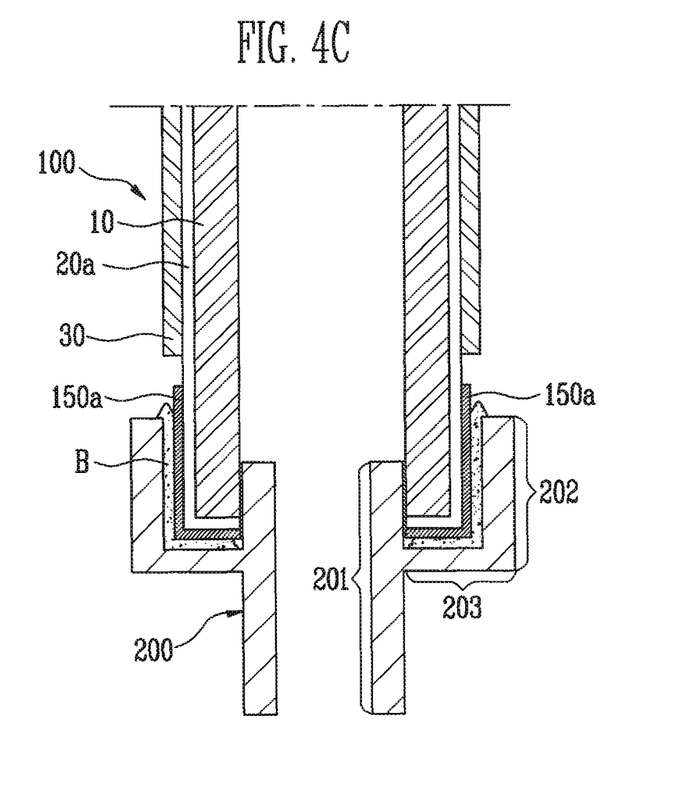
FIG. 4C is a sectional view showing a connection between a unit cell and a fixing member according to still another embodiment of the present invention.

In the case where, the main element used in the first electrode layer 10 is not YSZ, as shown in FIG. 4C, an electrolyte layer 20a extended between the first electrode layer 10 and the coating layer 150a may be further formed to increase the adhesion between the first electrode layer 10 and the coating layer 150a.

As shown in FIG. 5A, the extended electrolyte layer 20a may be extended in the same manner even when the coating layer is formed up to a lower inner circumferential surface of the first electrode layer 10.

Figure 5B:
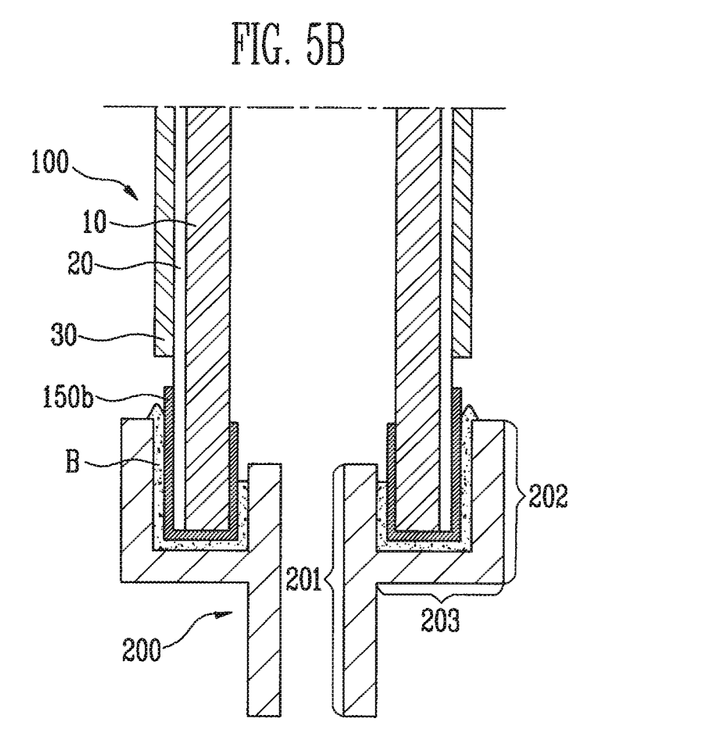

A welding portion B will be described with reference to FIGS. 2B, 4B and 5B. The welding portion B (filler-metal) functions to fix and seal the one end of the unit cell 100 and the cell fixing member 200 through the brazing process. BNi and/or BCu may be used as a main element of the welding portion B in consideration of the adhesion with the NiO and CuO, which are used in the coating layer 150.

Hereinafter, a method of manufacturing the unit cell 100 having the coating layer 150, 150a or 150b formed therein will be described. The detailed description of a method of manufacturing a general cell will be omitted.

First, the unit cell 100 is manufactured by forming the first electrode layer 10, the electrolyte layer 20 and the second electrode layer 30. In this case, the second electrode layer 20 surrounds the outer circumferential surface of the electrolyte layer 20 so that one end portion of the electrolyte layer 20 is exposed. As described with reference to FIG. 4C, the electrolyte layer 20a may be formed to extend up to the bottom of the first electrode layer 10 of the unit cell 100, on which the coating layer 150b or 150c is to be formed, if necessary.

Subsequently, the coating layer 150 is formed up to the bottom of the unit cell 100. If necessary, the coating layer 150b may be formed up to the lower inner circumferential surface of the unit cell 100. In this case, a dip-coating method may be used to form the coating layer. In the case of using the dip-coating method, the coating layer can be easily formed into the multi-layered structure in which the content of a metal element is gradually increased from the unit cell 100 to the outermost layer. That is, a coating process is performed by sequentially dipping the manufactured unit cell 100 into a dip-coating solution in which the content of a metal element such as Ni or Cu is gradually or continuously increased. In this case, a drying process may be further performed every coating process. In the dip-coating solution, the content of the metal element may be sequentially increased in the range of 50 to 95 wt %. FIGS. 8, 9, 10, and 11 show results obtained in experiments performed twice with respect to crack occurrence frequency through a welding portion based on the composition ratio of metal and ceramic elements in a coating layer. As can be seen in the experimental results, the occurrence of cracks is considerably decreased when the content of Ni is 50 wt % or higher.

Finally, the coating layer is sintered and reduced.

In view of the foregoing and according to an embodiment of the present invention, a connection between a unit cell having an electrolyte layer formed of a ceramic material and a cell fixing member formed of a metallic material is provided. In one embodiment, a fuel cell includes a unit cell, a cell fixing member and a welding portion. The unit cell includes a first electrode layer formed in a hollow circular or polygonal cylinder shape, an electrolyte layer that surrounds the outer circumferential surface of the first electrode layer, a second electrode layer that surrounds the electrolyte layer so that an end portion of the electrolyte layer is exposed, and a coating layer formed by coating a mixture of ceramic and metal on the outer circumferential surface of the exposed electrolyte layer. The cell fixing member includes a flow tube inserted into the unit cell to form a continuous flow path, a fixing tube provided to an outside of the flow tube to form a space for accommodating one end portion of the unit cell between the fixing tube and the flow tube, and a connecting portion that connects the fixing tube and the flow tube to each other and restricts the insertion depth of the electrolyte layer and the first electrode layer. The welding portion fixes and seals the coating layer and the inner circumferential surface of the fixing tube to each other. Accordingly, the wettability between a surface of the unit cell and filler-metal used in the brazing process is improved using a welding portion, thereby increasing the fixing and sealing ability between the unit cell and a cell fixing member or between the unit cell and the cell cap. As a high sealing ability is secured, it can be expected that the lifetime of the fuel cell will be extended, While the present invention has been described in connection with certain exemplary embodiments, it is to be understood that the invention is not limited to the disclosed embodiments, but, on the contrary, is intended to cover various fuel cells and methods of manufacturing the same, in which an effective brazing process can be performed between a cell cap or a unit cell and between a cell fixing member and a unit cell, included within the spirit and scope of the appended claims, and equivalents thereof.

What is claimed is:

1. A fuel cell comprising:
  a unit cell comprising a first electrode layer having a hollow circular or polygonal cylinder shape, an electrolyte layer surrounding an outer circumferential surface of the first electrode layer, a second electrode layer surrounding the electrolyte layer while exposing an end portion of the electrolyte layer, and a coating layer formed by coating a mixture of ceramic and a component selected from the group consisting of NiO, CuO and a combination thereof on an outer circumferential surface of the exposed end portion of the electrolyte layer;
  a cell fixing member comprising a flow tube inserted into the unit cell to form a continuous flow path, a fixing tube provided to an outside of the flow tube to form a space for accommodating an end portion of the unit cell between the fixing tube and the flow tube, and a connecting portion connecting the fixing tube and the flow tube to each other and to restrict an insertion depth of the electrolyte layer and the first electrode layer;
  a welding portion fixing and sealing the coating layer and the inner circumferential surface of the fixing tube to each other; and
  an electrolytically plated Ni and/or Cu on the coating layer between the coating layer and the welding portion.

2. The fuel cell according to claim 1, wherein the cell fixing member is formed of a metallic material.

3. The fuel cell according to claim 1, wherein the coating layer is coated to extend up to a bottom of the unit cell.

4. The fuel cell according to claim 3, wherein the coating layer is coated to extend up to a lower inner circumferential surface of the unit cell.

5. The fuel cell according to claim 3, wherein the electrolyte layer is further interposed between the unit cell and the extended coating layer.

6. The fuel cell according to claim 1, wherein the coating layer is formed into a multi-layered structure in which the content of a metal element is continuously increased from the unit cell to the welding portion.

7. The fuel cell according to claim 1, wherein a corner at an upper inner circumferential side of the fixing tube is chamfered or rounded.

8. The fuel cell according to claim 1, wherein an uneven portion is formed on an inner circumferential surface of the fixing tube.

9. The fuel cell according to claim 1, wherein the coating layer is formed of a mixture of yttria-stabilized zirconia (YSZ)-based ceramic and the NiO and/or Ca).

10. The fuel cell according to claim 9, wherein the welding portion comprises BNi and/or BCu.

11. A method of manufacturing the fuel cell according to claim 1, the method comprising:
  manufacturing the unit cell;
  forming the coating layer;
  sintering and reducing the coating layer.

12. The method according to claim 11, wherein the electrolyte layer is further formed before the forming of the coating layer.

13. The method according to claim 11, wherein the coating layer is formed using a dip-coating method.

14. The method according to claim 13, wherein the dip-coating method comprises:
  performing a coating process of sequentially dipping the manufactured unit cell into a dip-coating solution;
  performing a drying process of drying the dip-coating solution; and
  performing a post-processing process of repeatedly performing the coating and drying processes while increasing the content of a metal element in the dip-coating solution.

15. The method according to claim 13, wherein the content of the metal element in the dip-coating solution is sequentially increased in a range of 50 to 95 wt %.

16. The method according to claim 11, further comprising electrolytically plating Ni and/or Cu after the forming of the coating layer.

* * * * *